US012611060B2

(12) United States Patent
Ikeda

(10) Patent No.: US 12,611,060 B2
(45) Date of Patent: Apr. 28, 2026

(54) GLASS CONTAINER WITH IMAGE

(71) Applicant: CTI CORPORATION, Machida (JP)

(72) Inventor: Shuzo Ikeda, Machida (JP)

(73) Assignee: CTI CORPORATION, Tokyo (JP)

( * ) Notice: Subject to any disclaimer, the term of this patent is extended or adjusted under 35 U.S.C. 154(b) by 48 days.

(21) Appl. No.: 18/281,681

(22) PCT Filed: Sep. 27, 2022

(86) PCT No.: PCT/JP2022/035805
§ 371 (c)(1),
(2) Date: Sep. 12, 2023

(87) PCT Pub. No.: WO2023/127213
PCT Pub. Date: Jul. 6, 2023

(65) Prior Publication Data
US 2024/0298827 A1 Sep. 12, 2024

(30) Foreign Application Priority Data
Dec. 27, 2021 (JP) .................................. 2021-211808

(51) Int. Cl.
*A47G 19/22* (2006.01)
*C03C 23/00* (2006.01)
(52) U.S. Cl.
CPC ...... *A47G 19/2227* (2013.01); *C03C 23/0025* (2013.01)
(58) Field of Classification Search
CPC ................ A47G 19/2227; A47G 19/22; C03C 23/0025; B44C 3/00; B44C 5/00; B44F 1/10; G09F 19/00; B65D 23/00
USPC ........................................ 359/19
See application file for complete search history.

(56) References Cited

U.S. PATENT DOCUMENTS

| | | | | |
|---|---|---|---|---|
| 2010/0321797 A1* | 12/2010 | Schnuckle | ......... | A47G 19/2227 |
| | | | | 359/804 |
| 2013/0270264 A1* | 10/2013 | Suljak | ................ | B65D 25/2811 |
| | | | | 220/4.03 |

FOREIGN PATENT DOCUMENTS

| JP | 137683 | 10/1981 |
|---|---|---|
| JP | S56137693 U | 10/1981 |
| JP | 2000270990 A | 10/2000 |
| JP | 2011110928 A | 6/2011 |

(Continued)

OTHER PUBLICATIONS

Jang Jae-Hyung; JP2000270990; Imaging Cup for Decoration and Image Projection by Using the Same (Machine Translation) (Year: 2000).*

(Continued)

*Primary Examiner* — Bumsuk Won
*Assistant Examiner* — Rahman Abdur
(74) *Attorney, Agent, or Firm* — K&L Gates LLP

(57) ABSTRACT

This container has a bottom section (11) made of a transparent or translucent material and a tubular section (12) being continuous with the bottom section (11), and has at least one first image (13) formed inside the bottom section (11) thereof by laser processing and/or at least one second image formed on the side surface of the bottom section (10) thereof by a processing method other than laser processing. At least a partial area (11*a*) of the side surface of the bottom section (11) behind the first image and/or the second image when the first image and/or the second image is viewed from the main viewing direction is processed in a color other than white.

4 Claims, 10 Drawing Sheets

10

11

(56)      References Cited

FOREIGN PATENT DOCUMENTS

| | | | |
|---|---|---|---|
| JP | 3178264 | U | 9/2012 |
| JP | 5305203 | B2 | 10/2013 |
| JP | 3200099 | U | 10/2015 |
| JP | 6083006 | B1 | 2/2017 |

OTHER PUBLICATIONS

Plat et al.; Automated color printing of glass by using a laser-burning process; Lasers and Manufacturing Conference , Hannover, Germany (Year: 2017).*

Takahashi Kiyosh, Jp 2001277798, Takahashi Kiyosh (Year: 2001); the Examiner provided a machine translation.*

International Search Report from corresponding PCT application PCT/JP2022/035805, dated Dec. 6, 2022.

Office Action issued in related Japanese patent application No. 2021-211808, dated Feb. 25, 2022. (3 pages.).

PCT International Preliminary Report on Patentability issued Jun. 20, 2024.

Written Opinion of the International Searching Authority from corresponding PCT application PCT/JP2022/035805, dated Dec. 6, 2022.

* cited by examiner

11a $\theta$

11

VIEWING DIRECTION

11a

VIEWING DIRECTION 2

VIEWING DIRECTION 3

VIEWING DIRECTION 1

GLASS CONTAINER WITH IMAGE

TECHNICAL FIELD

The present invention relates to a container, and is suitable for application to various containers such as glasses.

BACKGROUND ART

Conventionally, there has been known a technique of forming an image by applying laser processing to the inside of the bottom section of a glass (see patent literatures 1 and 2).

In addition, there has been known an ornament in which an image is formed inside a transparent or translucent material by laser processing and the back surface is processed in black or dark, the ornament having inclined side surfaces and the inclined top surface formed such that they wide toward the front surface from the back surface (see patent literature 3).

PRIOR ART LITERATURE

Patent Literature

[PATENT LITERATURE 1] Specification of Utility Model Registration No. 3200099
[PATENT LITERATURE 2] Specification of U.S. Pat. No. 6,083,006
[PATENT LITERATURE 3] Specification of U.S. Pat. No. 5,305,203

SUMMARY OF INVENTION

Subjects to be Solved by Invention

The techniques of patent literatures 1 and 2 can accurately form an image inside the bottom section of the glass regardless of the curvature, distortion, unevenness and the like that exist on the surface of the bottom section of the glass. However, regarding glasses formed by the techniques, when the glasses are viewed from the side surface, it is difficult to view the image formed inside the bottom section. Therefore, there is room for improvement in this respect.

Therefore, the subject to be solved by the present invention is to provide a container such as a glass in which an image formed inside the bottom section and/or on the side surface of the bottom section can be clearly viewed when viewed from the side surface.

Means to Solve the Subjects

In order to solve the subject, according to the invention, there is provided a container, comprising:
a bottom section made of a transparent or translucent material; and
a tubular section being continuous with the bottom section,
the container having at least one first image formed inside the bottom section by laser processing and/or at least one second image formed on the side surface of the bottom section by a processing method other than laser processing,
at least a partial area of the side surface of the bottom section behind the first image and/or the second image when the first image and/or the second image is viewed from a main viewing direction being processed in a color other than white.

The shape of the bottom section of the container is not particularly limited as long as the bottom section acts as a convex lens for light incident on the side surface of the bottom section, and is specifically, for example, cylindrical, elliptic cylindrical, or n-gonal prismatic (where n is an integer of 5 or more). These cylindrical, elliptic cylindrical, or n-gonal prismatic shapes may be shapes in which the cross-sectional size (diameter, length of major axis or minor axis and the like) is constant or changes in the direction of the central axis of the bottom section. The main viewing direction of the first image formed inside the bottom section and/or the second image formed on the side surface of the bottom section is determined by the shape of the first image and/or the second image and the like. Typically, when the first image and/or the second image is viewed from a particular direction perpendicular to the central axis of the bottom section, if the features of the image are best seen in that direction, then that direction is the main viewing direction. The area of the side surface of the bottom section processed in a color other than white is provided to include at least a part of an area of the side surface of the bottom section of the back side from which light is emitted when light is incident on the side surface of the bottom section from the main viewing direction side, preferably a main part of the area, most preferably all of the area. When there are multiple main viewing directions, an area processed in a color other than white is provided for each viewing direction, or a wide area processed in a color other than white is provided to include these areas. The color other than white may basically be any color, and the hue, brightness and chroma are selected as necessary, including achromatic and chromatic colors other than white. Since the area processed in a color other than white is provided as described above, when the first image formed inside the bottom section and/or the second image formed on the side surface of the bottom section is viewed from the main viewing direction, the area processed in a color other than white appears as a virtual image in the background. As a result, the first image and/or the second image can be viewed clearly. Also, depending on the choice of shape, size, position, color and the like of the area processed in a color other than white, it may add a unique background to the first image and/or the second image. As a result, it is possible to exert a unique adorning effect to the first image and/or the second image. In general, if the central angle with respect to the central axis of the bottom section of the area processed in a color other than white of the side surface of the bottom section is 20° or more (typically 90° or less is sufficient), a major portion or all of the background of the image when the first image and/or the second image is viewed from the main viewing direction can be a color other than white. In this case, it is sufficient to provide the area processed in a color other than white only on a part of the side surface of the bottom section, so that the labor and costs required for the process can be reduced. In addition, since light incident on the side surface of the bottom section is incident on the area processed in a color other than white, reflection is suppressed. As a result, when the first image and/or the second image is viewed from the main viewing direction, unnecessary reflected light can be suppressed and this also allows the first image and/or the second image to be viewed clearly. A conventionally known method can be used as a method for processing a part of the side surface of the bottom section in a color other than white, and is selected as necessary. As a processing method other than laser processing for forming the second image on the side surface of the bottom section, a conventionally known method such as sandblasting can be used, and is selected as necessary. The first image and the second image may basically be of any type, including characters and graphics.

The container may basically be of any type as long as it has a bottom section made of a transparent or translucent material and a tubular section being continuous with the bottom section. Typically, the whole of the container including the tubular section is made of a transparent or translucent material. This transparent or translucent material is typically glass. Basically, any glass may be used, and examples thereof include soda glass, crystal glass (lead glass), borosilicate glass, quartz glass and the like.

The container may basically be of any type, and is not particularly limited, and examples thereof include glasses, cups, wine glasses, beer mugs, teacups, teapots, pots, bowls, pitchers, ice pails, plates, seasoning bottles and the like.

Effect of the Invention

According to the invention, since at least a partial area of the side surface of the bottom section behind the first image formed inside the bottom section of the container and/or the second image formed on the side surface of the bottom section when the first image and/or the second image is viewed from the main viewing direction is processed in a color other than white, the image can be viewed clearly.

BRIEF DESCRIPTION OF THE DRAWINGS

FIG. 4 A transverse cross-sectional view showing the bottom section of the glass according to the first embodiment.

MODES FOR CARRYING OUT THE INVENTION

Modes for carrying out the invention (hereinafter referred as embodiments) will now be explained below.

The First Embodiment

[Glass]

Figure 1:
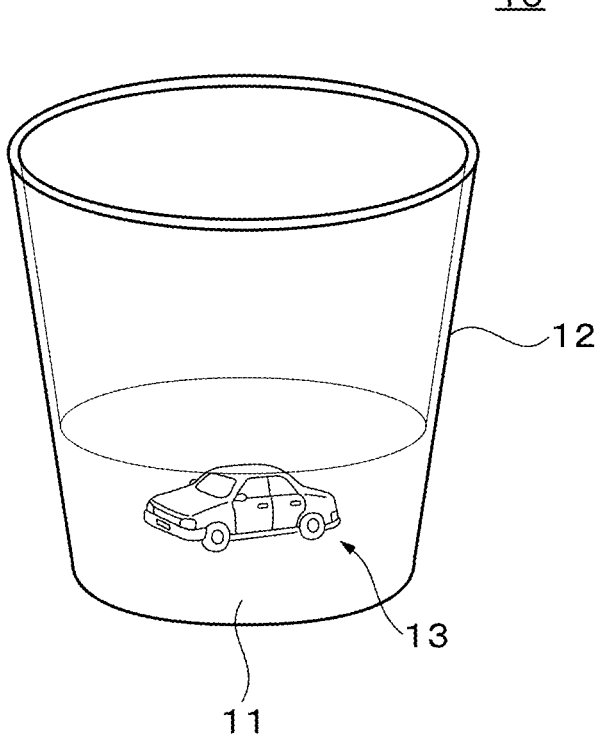
FIG. 1 A perspective view showing a glass according to a first embodiment.

FIG. 1 shows a glass 10 according to the first embodiment. FIG. 2A, FIG. 2B, FIG. 2C, FIG. 2D and FIG. 2E are front, rear, top, bottom and longitudinal cross-sectional views of the glass 10, respectively.

As shown in FIG. 1, FIG. 2A, FIG. 2B, FIG. 2C, FIG. 2D and FIG. 2E, the glass 10 has a thick bottom section 11 and a thin tubular section 12 which is continuous with the bottom section 11 and widens upward, and is made entirely of transparent or translucent glass. In this case, the bottom section 11 has the shape of a reverse-tapered cylinder (or an inverted truncated cone) and the tubular section 12 has the shape of a likewise reverse-tapered cylinder. The inner bottom surface of the glass 10 is recessed. In this case, an image 13 is formed inside the bottom section 11 of the glass 10 by laser processing. In addition to this, a partial area 11a of the side surface of the bottom section 11 behind the image 13 when the image 13 is viewed from the main viewing direction is processed in a color other than white, for example, black or dark. In FIG. 1, FIG. 2A, FIG. 2B, FIG. 2C, FIG. 2D and FIG. 2E, as an example, the image 13 of a passenger car created based on two-dimensional data of a photograph of a passenger car taken by a camera is formed. The size, position and the like of the image 13 are determined as necessary.

Figure 2A:
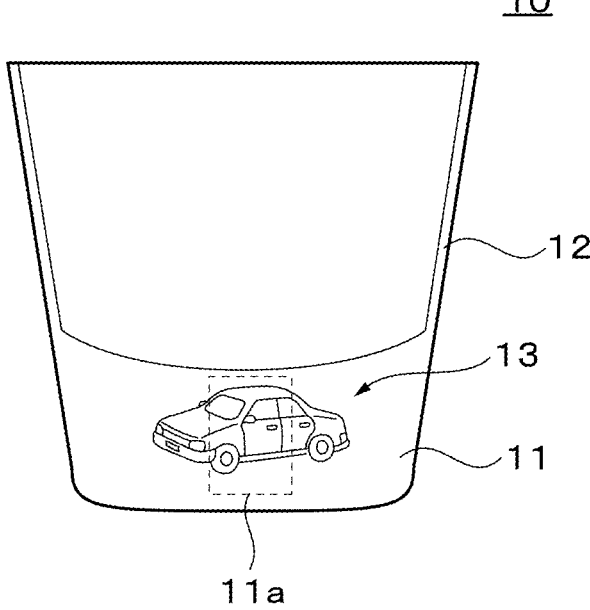
FIG. 2A A front view showing the glass according to the first embodiment.
Figure 2B:
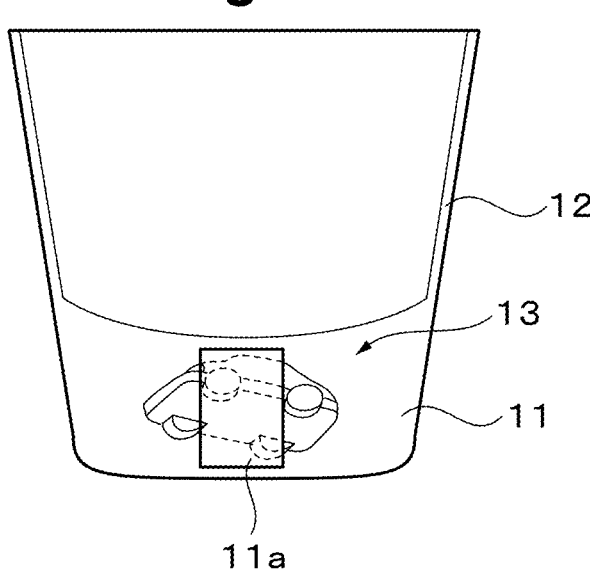
FIG. 2B A rear view showing the glass according to the first embodiment.
Figure 2C:
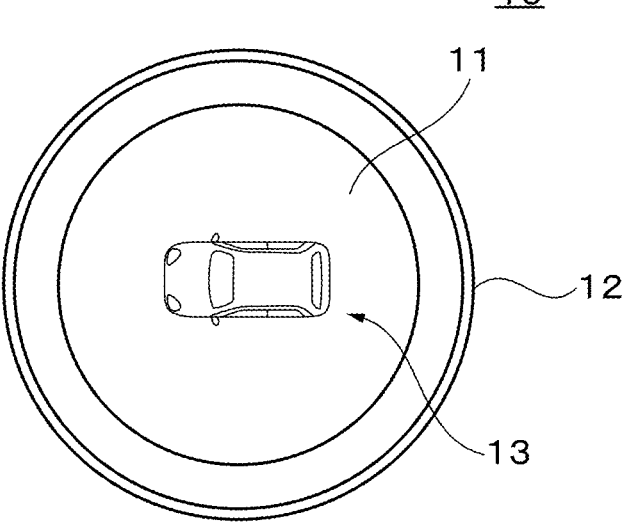
FIG. 2C A top view showing the glass according to the first embodiment.
Figure 2D:
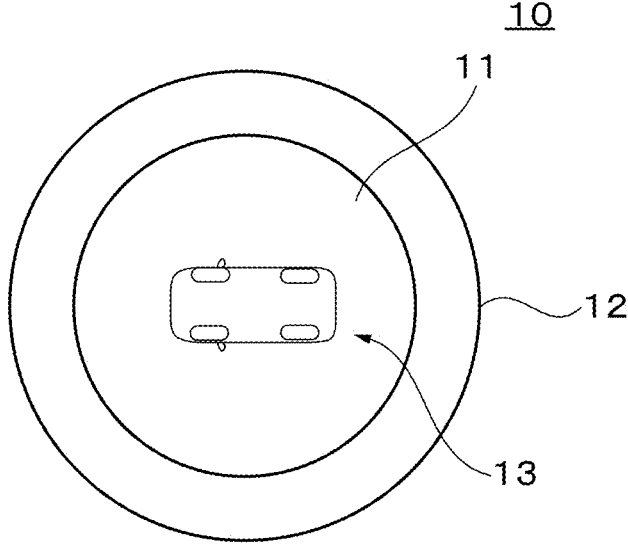
FIG. 2D A bottom view showing the glass according to the first embodiment.
Figure 2E:
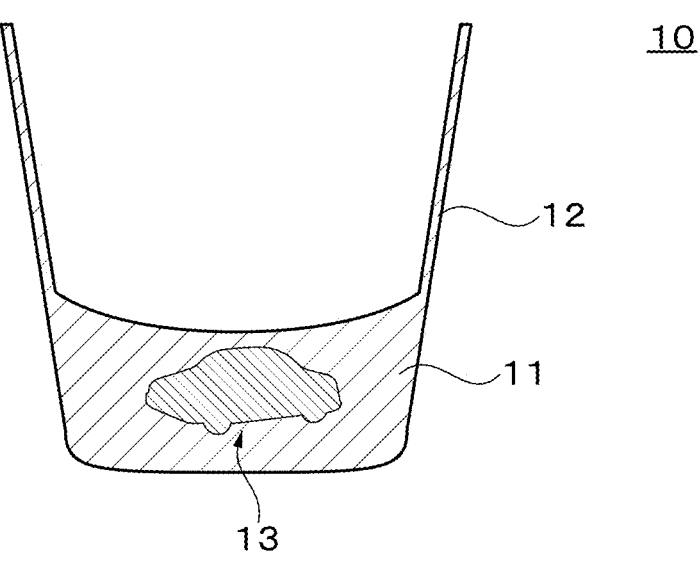
FIG. 2E A longitudinal cross-sectional view showing the glass according to the first embodiment.

The size, shape, position and the like of the area 11a processed in a color other than white are determined such that the area 11a covers at least a part of an area of the side surface of the bottom section 11 behind the viewing direction from which light is emitted after light incident on the side surface of the bottom section 11 of the glass 10 from the viewing direction side passes through the inside of the bottom section 11, and can be appropriately selected depending on how the image 13 is desired to be displayed. In FIG. 2A and FIG. 2B, as an example, shown is a case where the area 11a is rectangular, the width in the direction perpendicular to the central axis of the glass 10 is smaller than the width of the image 13 in that direction, and the width in the central axis direction of the glass 10 is smaller than the thinnest part of the bottom section 11.

Figure 3:
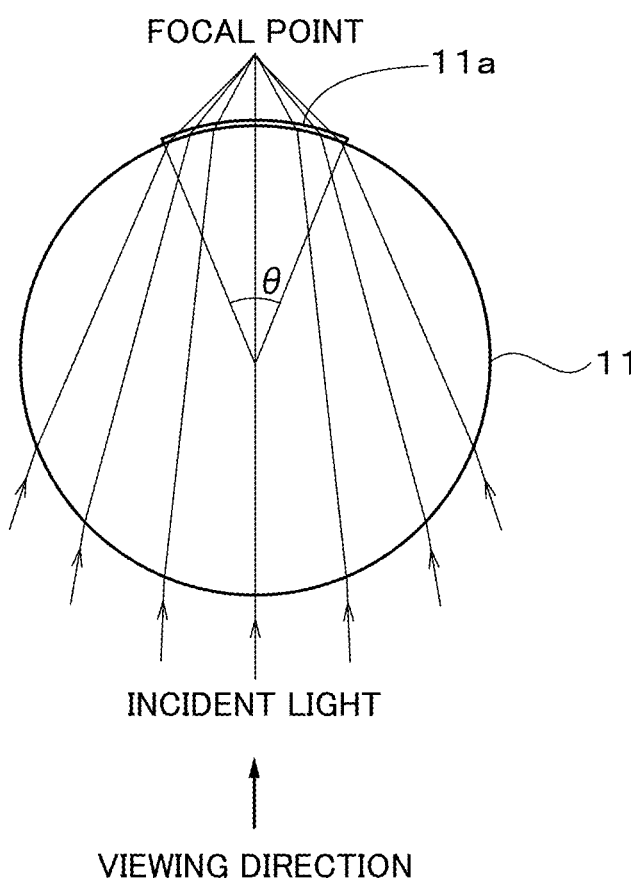
FIG. 3 A transverse cross-sectional view showing the bottom section of the glass according to the first embodiment.
Figure 4:
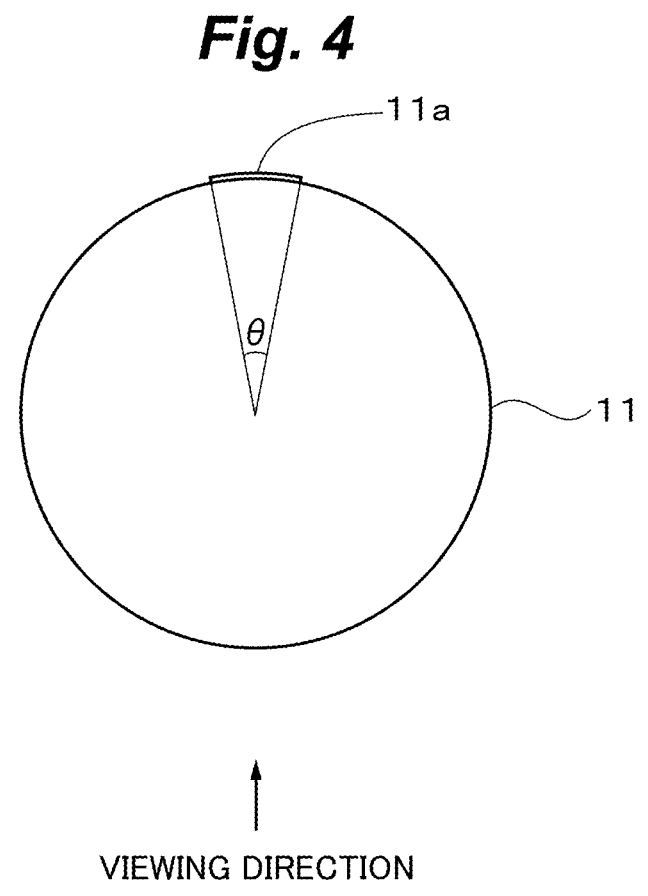

The action of the area 11a formed on the side surface of the bottom section 11 and processed in a color other than white will be described. FIG. 3 shows the bottom section 11 of the glass 10. In FIG. 3, illustration of the image 13 is omitted. Here, the taper angle of the bottom section 11 is assumed to be small and the bottom section 11 is assumed to be a cylinder. The central angle of the area 11*a* around the central axis of the bottom section 11 is e. In this case, the bottom section 11 constitutes a cylindrical lens that is a convex lens. When the side surface of the bottom section 11 is viewed from the viewing direction, if the area 11*a* processed in a color other than white does not exist on the side surface, light incident on the side surface of the bottom section 11 is refracted at the side surface of the bottom section 11 due to the action by the cylindrical lens and the light is emitted from the side surface of the bottom section 11 on the back side and converged to a focal point as shown by the light rays in FIG. 3. However, since the area 11*a* processed in a color other than white is provided, the light directed to the focal point inside the bottom section 11 is blocked by the area 11*a*. As a result, when the side surface of the bottom section 11 is viewed from the viewing direction, even though the width of the area 11*a* is smaller than the width of the image 13, the viewer sees a color other than white behind the image 13 over a wider width than the image 13. As a result, the image 13 can be clearly viewed. In addition, when the side surface of the bottom section 11 is viewed from the viewing direction, unnecessary reflection of light by the glass 10 can be suppressed, so that the image 13 can be further clearly viewed. The above is the case where the bottom section 11 is a cylindrical lens, but the same holds true even if the bottom section 11 has the shape of an inverted truncated cone. Further, in order to make the background of the image 13 appear to be a color other than white only partially in the width direction of the image 13, as shown in FIG. 4, the central angle θ of the area 11*a* is selected to be small.

[Glass Manufacturing Method]

A method for manufacturing the glass 10 will be described.

First, the image 13 is formed inside the bottom section 11 of the glass 10 in the same manner as in the first embodiment described in patent literature 2, for example.

Then, a predetermined area of the side surface of the bottom section 11 of the glass 10 is processed in a color other than white to form the area 11*a*. The method of processing in a color other than white is not particularly limited, and can be appropriately selected from conventionally known methods. Examples of the method are application of the paint of a color other than white, printing with an ink of a color other than white, forming a light absorbing film by a vacuum evaporation method or a sputtering method, forming a portion near the side surface of the bottom section 11 with a colored glass of a color other than white and the like.

As described above, the desired glass 10 is manufactured as shown in FIG. 1, FIG. 2A, FIG. 2B, FIG. 2C, FIG. 2D and FIG. 2E.

Note that the image 13 may be formed inside the bottom section 11 of the glass 10 after a predetermined area of the side surface of the bottom section 11 of the glass 10 is processed in a color other than white.

As described above, according to the first embodiment, the area 11*a* processed in a color other than white is provided on the side surface of the back side of the bottom section 11 of the glass 10 when viewed from the viewing direction, so that the image 13 can be clearly viewed. In addition, since it is sufficient to provide the area 11*a* only on a part of the side surface of the bottom section 11, the area 11*a* can be formed at low cost.

The Second Embodiment

[Glass]

Figure 5:
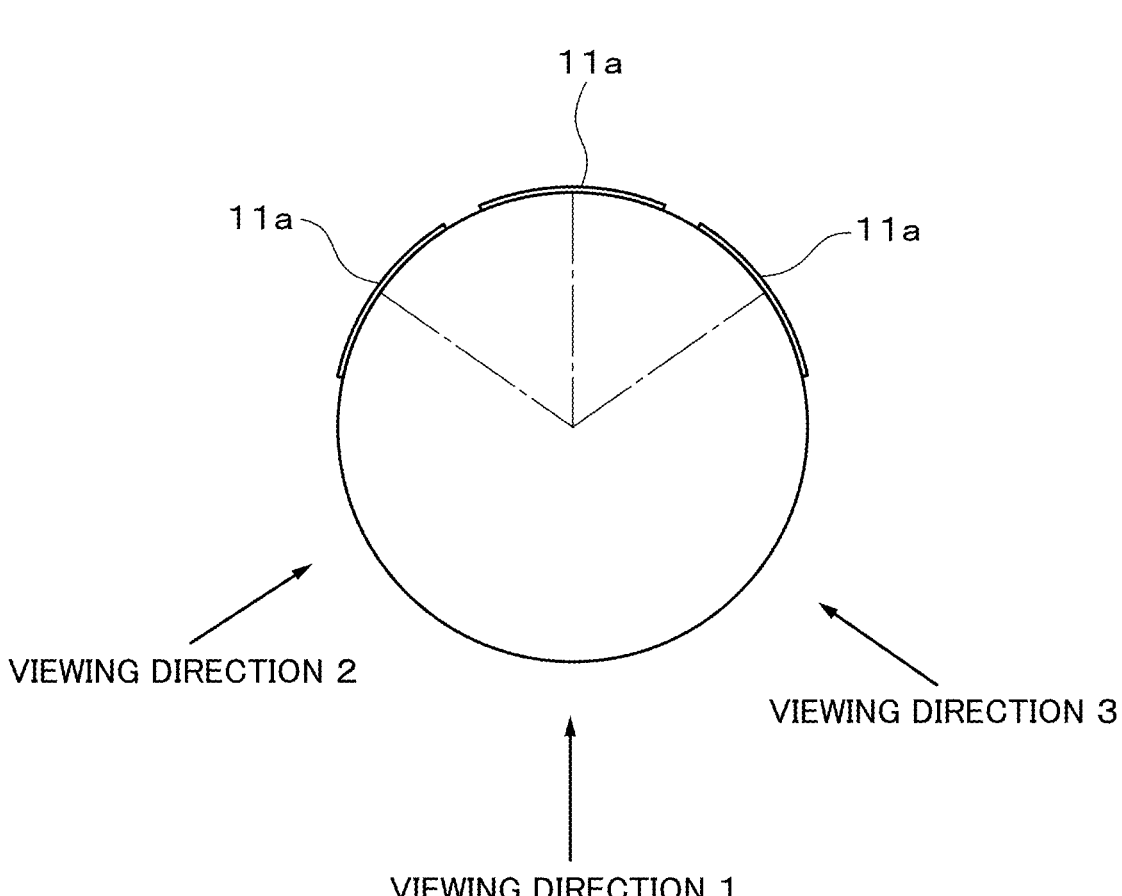
FIG. 5 A transverse cross-sectional view showing the bottom section of a glass according to a second embodiment.

FIG. 5 shows the bottom section 11 of the glass 10 according to the second embodiment. As shown in FIG. 5, the glass 10 has three main viewing directions (viewing directions 1, 2, and 3) forming an angle of 45° with each other for the image 13 formed inside the bottom section 11. The areas 11*a* processed in colors other than white are provided on the side surfaces of the back side of the bottom section 11 when viewed from the viewing directions. Other aspects of the glass 10 are the same as those of the glass 10 according to the first embodiment.

[Glass Manufacturing Method]

The method of manufacturing the glass 10 is the same as in the first embodiment.

According to the second embodiment, when the image 13 is viewed from three main viewing directions, the image 13 can be clearly viewed from any direction.

The Third Embodiment

[Glass]

Figure 6:
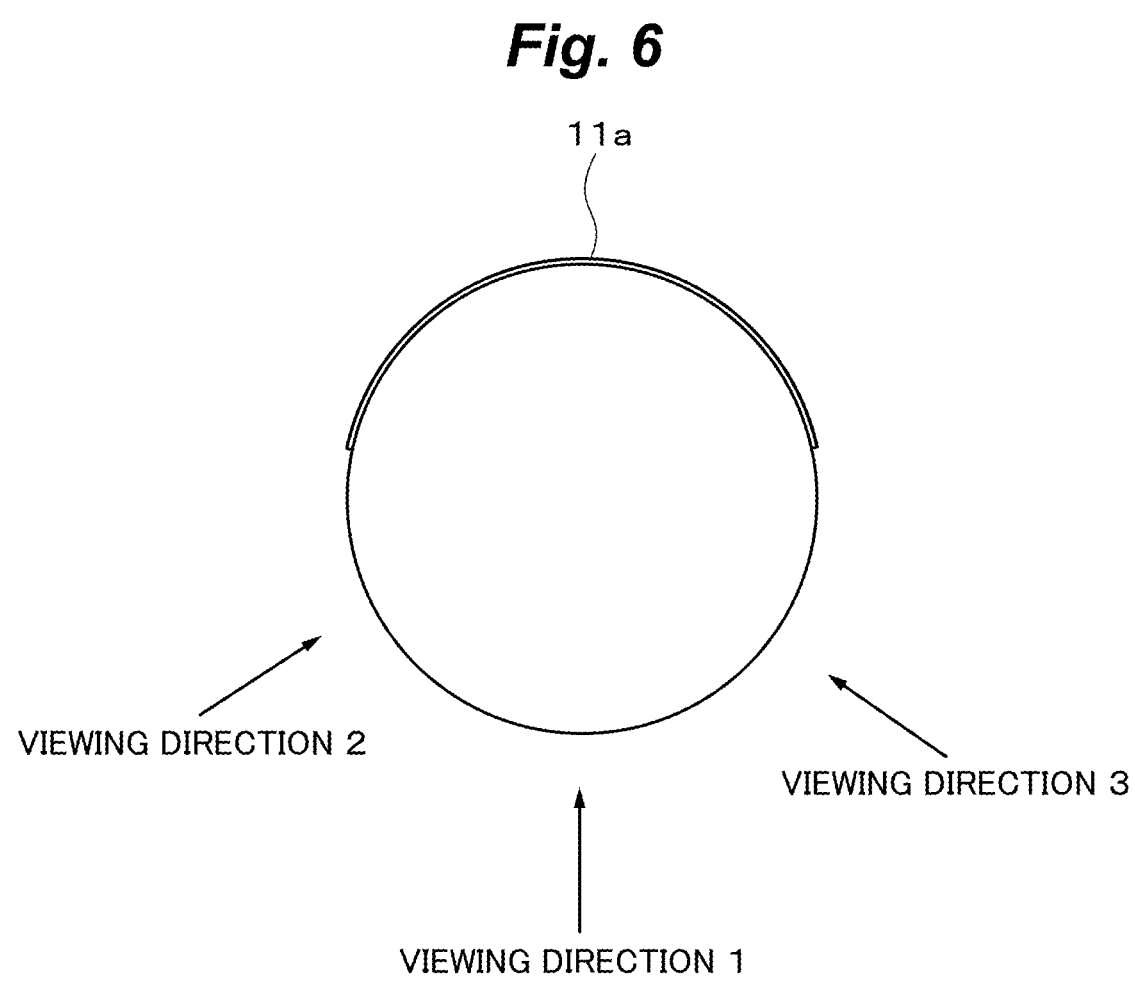
FIG. 6 A transverse cross-sectional view showing the bottom section of a glass according to a third embodiment.

FIG. 6 shows the bottom section 11 of the glass 10 according to the third embodiment. As shown in FIG. 6, in the glass 10, the main viewing directions of the image 13 formed inside the bottom section 11 are three directions forming an angle of 45° with each other. Instead of providing the areas 11*a* processed in colors other than white on the sides of the back side of the bottom section 11 when viewed from these viewing directions, one area 11*a* having a size to cover these three areas 11*a* is provided. Other aspects of the glass 10 are the same as those of the glass 10 according to the first embodiment.

[Glass Manufacturing Method]

The method of manufacturing the glass 10 is the same as in the first embodiment.

According to the third embodiment, advantages similar to those of the second embodiment can be obtained.

EXAMPLE

Figure 7A:
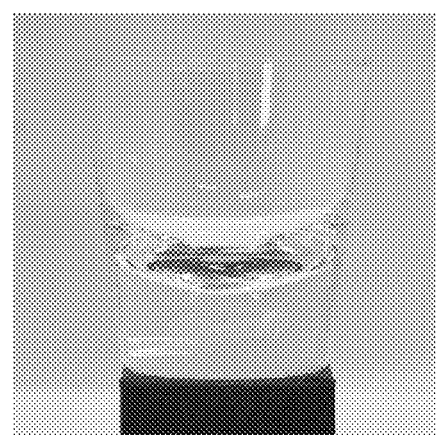
FIG. 7A A drawing-substituting photograph of a glass of an example taken from the front in a state before a part of the side surface of the bottom section is processed in black.
Figure 7B:
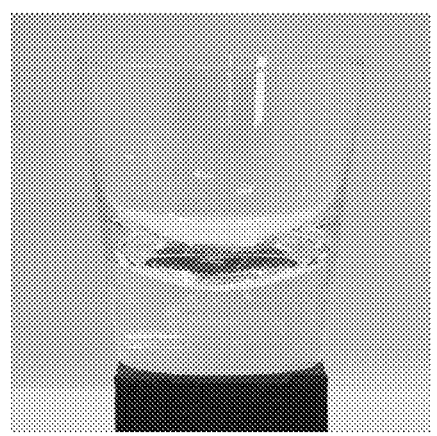
FIG. 7B A drawing-substituting photograph of the glass of the example taken from the back in a state before the part of the side surface of the bottom section is processed in black.
Figure 8A:
FIG. 8A A drawing-substituting photograph of the glass of the example taken from the front in which the width of the part of the side surface of the bottom section processed in black is 1 cm.
Figure 8B:
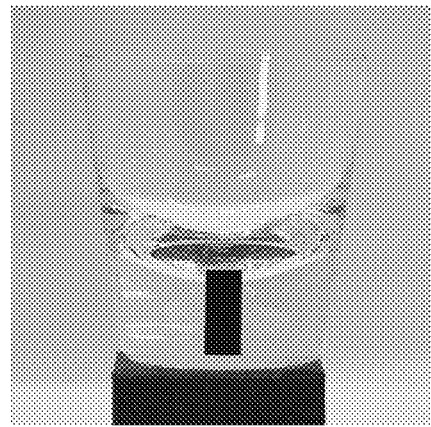
FIG. 8B A drawing-substituting photograph of the glass of the example taken from the back in which the width of the part of the side surface of the bottom section processed in black is 1 cm.
Figure 9A:
FIG. 9A A drawing-substituting photograph of the glass of the example taken from the front in which the width of the part of the side surface of the bottom section processed in black is 1.5 cm.
Figure 9B:
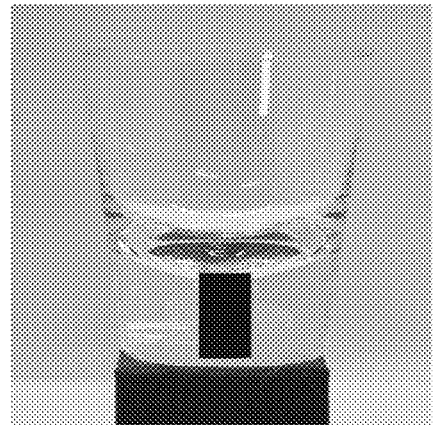
FIG. 9B A drawing-substituting photograph of the glass of the example taken from the back in which the width of the part of the side surface of the bottom section processed in black is 1.5 cm.
Figure 10A:
FIG. 10A A drawing-substituting photograph of the glass of the example taken from the front in which the width of the part of the side surface of the bottom section processed in black is 2 cm.
Figure 10B:
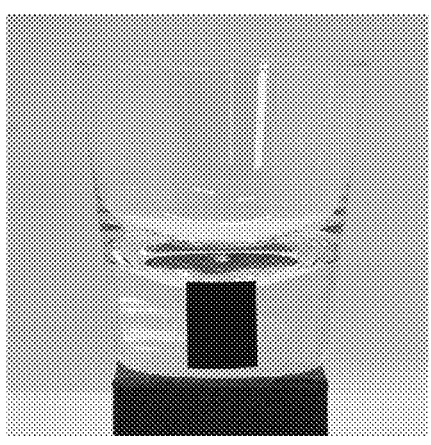
FIG. 10B A drawing-substituting photograph of the glass of the example taken from the back in which the width of the part of the side surface of the bottom section processed in black is 2 cm.

A passenger car was formed as the image 13 by applying laser processing to the inside of the thick bottom section of a commercially available transparent soda-lime glass by a method similar to the manufacturing method of the glass 10 described above. FIG. 7A shows a photograph of the glass 10 in this state taken from the front (viewing direction), and FIG. 7B shows a photograph taken from the back (opposite side to the viewing direction). The glass 10 has a bottom diameter of 6 cm, a top diameter of 8.4 cm, and a height of 7.8 cm. The inner bottom surface of the glass 10 is recessed, and the thickness of the bottom section of this recessed portion is 2.5 cm, and the thickness of the bottom section on the side surface is 3.5 cm. The passenger car as the image 13 has a width of about 2.5 cm and a height of about 1.2 cm. FIG. 8A is a photograph taken from the front of the glass 10 in which a sheet of paper colored black on both sides cut into a width of 1 cm and a height of 2.5 cm was pasted on the side surface of the bottom section as the area 11*a* processed in a color other than white, and FIG. 8B shows a photograph taken from the back. FIG. 9A is a photograph taken from the front of the glass 10 in which a sheet of paper colored black on both sides cut into a width of 1.5 cm and a height of 2.5 cm was pasted on the side surface of the bottom section as the area 11*a* processed in a color other than white, and FIG. 9B shows a photograph taken from the back. FIG. 10A is a photograph taken from the front of the glass 10 in which a sheet of paper colored black on both sides cut into a width of 2 cm and a height of 2.5 cm was pasted on the side surface of the bottom section as the area 11*a* processed in a color other than white, and FIG. 10B shows a photograph taken from the back. As shown in FIG. 7A, the passenger car as the image 13 is not clearly viewed. As shown in FIG. 8A, when the width of the area 11*a* is 1 cm, the background of the central portion of the passenger car as the image 13 is black. As shown in FIG. 9A, when the width of the area 11*a* is 1.5 cm, the background of almost the entire passenger car as the image 13 is black. As shown in FIG. 10A, when the width of the area 11*a* is 2 cm, the background of the entire passenger car as the image 13 is black. As shown in FIG. 8A, FIG. 9A and FIG. 10A, it is understood that the image 13 can be viewed clearly because the background of the image 13 is partly, predominantly or entirely black.

Although the embodiments and examples of the present invention have been specifically described above, the present invention is not limited to the above-described embodiments and examples, and various modifications based on the technical idea of the present invention can be made.

For example, the numerical values, configurations, shapes, materials, methods and the like given in the above-described embodiments and examples are merely examples, and if necessary, different numerical values, configurations, shapes, materials, methods and the like may be used.

Further, if necessary, in the first to third embodiments, an image may also be formed on the inside and/or the side surface of the tubular section 12 of the glass 10 by laser processing. In this case, the inner surface of the tubular section 12 behind this image when the side surface of the tubular section 12 is viewed from the main viewing direction may have an area processed in a color other than white.

EXPLANATION OF REFERENCE NUMERALS

10 Glass
11 Bottom section
11*a* Area processed in a color other than white
12 Tubular section
13 Image

The invention claimed is:

1. A container, comprising:
an upper section that is empty;
a bottom section made of a transparent or translucent glass and in contact with the upper section; and
a tubular section being continuous with the upper section and the bottom section, the container having at least one first image formed inside the bottom section by laser processing,
the bottom section having a shape of a convex lens for light incident on the side surface of the bottom section,
at least a partial area of the side surface of the bottom section behind the first image when the first image is viewed from a main viewing direction perpendicular to a central axis of the bottom section, being processed in a color other than white,
wherein at least the partial area of the side surface of the bottom section including a part, a main part, or all of an area from which light is emitted from the side surface of the bottom section when light is incident on the side surface of the bottom section from the viewing direction side.

2. The container according to claim 1 wherein the bottom section has a cylindrical shape, an elliptic cylindrical shape, or an n-gonal prismatic shape (where n is an integer of 5 or more).

3. The container according to claim 1 wherein at least the partial area of the side surface of the bottom section includes an entire area from which light is emitted from the side surface of the bottom section when light is incident on the side surface of the bottom section from the viewing direction side.

4. The container according to claim 1 wherein the container has at least one second image formed on the side surface of the bottom section by a processing method other than laser processing.

* * * * *